United States Patent
Oikawa et al.

(10) Patent No.: US 7,841,001 B2
(45) Date of Patent: Nov. 23, 2010

(54) AUTHENTICATION INFORMATION MANAGEMENT METHOD FOR DEVICE EMBEDDED WITH MICROPROCESSOR UNIT

(75) Inventors: Mitsuhiro Oikawa, Yokohama (JP); Hidenobu Taniguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 925 days.

(21) Appl. No.: 11/626,448

(22) Filed: Jan. 24, 2007

(65) Prior Publication Data

US 2008/0022364 A1    Jan. 24, 2008

(30) Foreign Application Priority Data

Jul. 19, 2006    (JP) .............................. 2006-196407

(51) Int. Cl.
   G06F 7/04    (2006.01)
   G06F 17/30    (2006.01)
   G06F 15/16    (2006.01)
   G06F 12/00    (2006.01)
   G06F 12/14    (2006.01)
   G06F 13/00    (2006.01)
   H04L 29/06    (2006.01)
   G11C 7/00    (2006.01)

(52) U.S. Cl. .................... 726/20; 726/2; 726/8; 726/16; 726/17; 726/18; 726/19; 726/21; 713/182; 713/183; 713/184; 713/185

(58) Field of Classification Search ................ 726/2–9, 726/26–30; 713/182–189
See application file for complete search history.

(56) References Cited

U.S. PATENT DOCUMENTS

| 7,117,369 | B1 * | 10/2006 | Burns et al. ................. 713/182 |
| 7,175,076 | B1 * | 2/2007 | Block et al. ................. 235/379 |
| 2005/0033983 | A1 * | 2/2005 | Takekawa et al. ........... 713/200 |
| 2007/0006301 | A1 * | 1/2007 | Nickell et al. ................. 726/22 |
| 2007/0028118 | A1 * | 2/2007 | Brown et al. ................. 713/185 |

FOREIGN PATENT DOCUMENTS

JP    2002-298097    10/2002

OTHER PUBLICATIONS

"Welcome to MULTOS" pp. 1-23, MAOSCO Ltd., 2003.

* cited by examiner

*Primary Examiner*—Taghi T Arani
*Assistant Examiner*—Madhuri Herzog
(74) *Attorney, Agent, or Firm*—Antonelli, Terry, Stout & Kraus, LLP.

(57) ABSTRACT

Without modifying application programs in a smart card, data and functions of the application programs can be used by one authentication operation if an apparatus has an invented authentication information management function utilization part. Even if the apparatus not implemented with the invention can use the smart card in a similar manner to the conventional manner. An authentication information management program for managing information necessary for authentication of each application is introduced into the smart card. When each application is utilized, the authentication information management program acquires the application authentication information after an authentication request message from the application program is captured, and transmits the application authentication information to the application program. It is possible to realize a method of utilizing data and functions possessed by the application programs through one authentication operation.

8 Claims, 6 Drawing Sheets

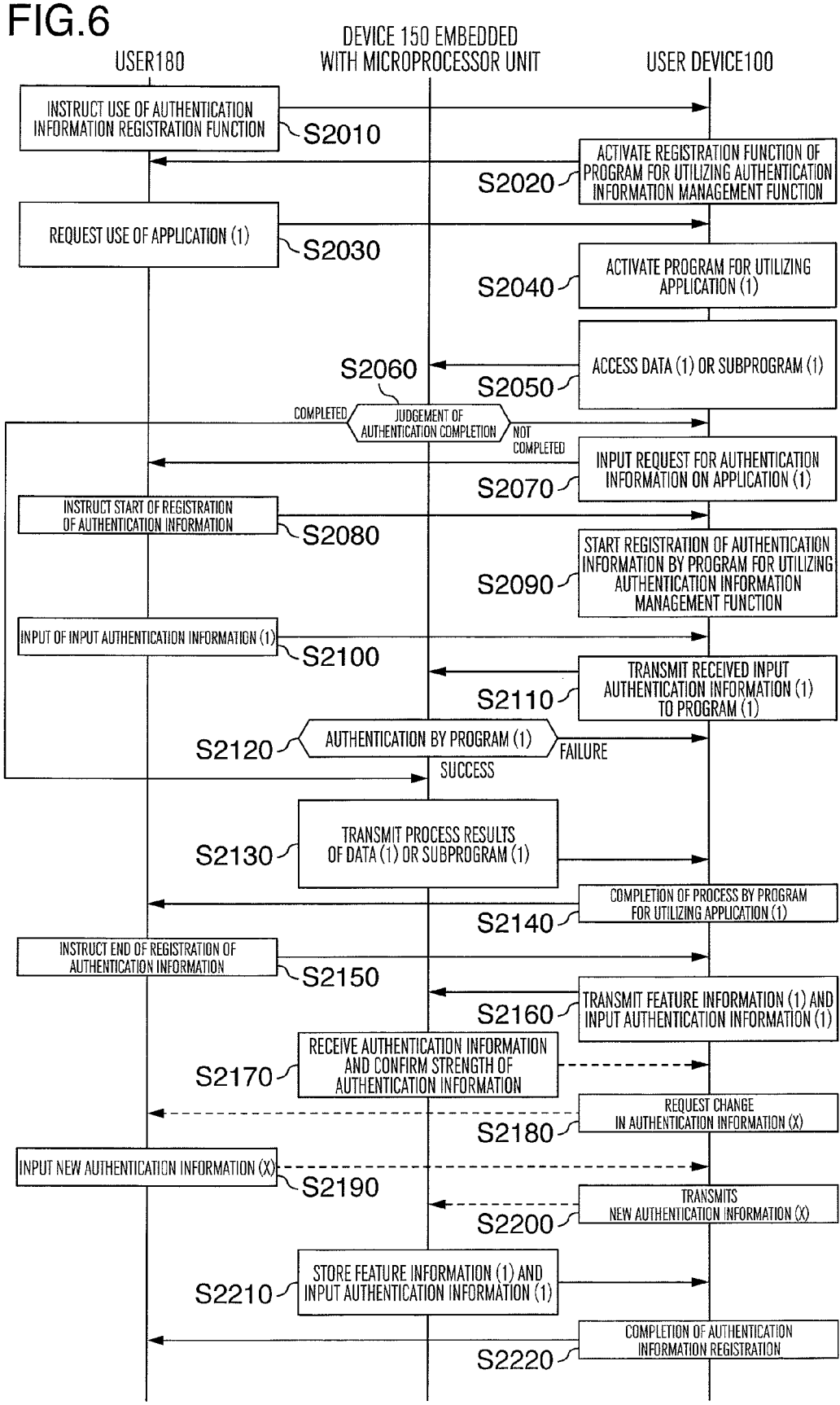

AUTHENTICATION INFORMATION MANAGEMENT METHOD FOR DEVICE EMBEDDED WITH MICROPROCESSOR UNIT

INCORPORATION BY REFERENCE

This application claims priority based on a Japanese patent application, No. 2006-196407 filed on Jul. 19, 2006, the entire contents of which are incorporated herein by reference.

BACKGROUND

The present invention relates to techniques for using application programs each having an authentication function and provided in a device embedded with a microprocessor unit.

Spread of IC cards has started recently in full scale mainly around cash cards, commutation tickets, employee's certificates, basic resident registration cards and the like. A device embedded with a microprocessor unit (this is called a device embedded with the microprocessor unit) such as an IC card (or a smart card) is tamper resistant so that it is used also as a deposit medium for storing authentication information, a private key and the like which are used to authenticate a user of the Internet or PC. Among devices embedded with microprocessor units, there are multiple function devices each of which is embedded with a microprocessor unit and can fabricate a plurality of application programs (e.g., a multi application smart card described in MAOSCO Limited, "Welcome to MULTOS", 2003, MAOSCO Limited, http:¥www.multos.com/library/pdf/03 05 07%20Welcome%20to%MULTOS.pdf (hereinafter called Document 1)).

If a user owes even one multi functional device embedded with a microprocessor unit, the user can use a plurality of application programs, putting the device to use convenience. From a different viewpoint, however, each application program is designed independently so that one device embedded with a microprocessor unit has a plurality of same data and functions in some cases.

If each application program has data and functions whose access control is desired to be made individually, each application program has to have individually an authentication function.

Examples of an application program is an application equipped with a public key infrastructure (PKI), an application equipped with a biometrics management function, an application equipped with an electronic money function and the like. Data and functions of these applications are not permitted to use unless a success is obtained in authentication (e.g., authentication using personal identification number (PIN)) corresponding to each application).

Therefore, when a user uses a plurality of application programs, it is required to perform a plurality of authentication operations, posing a problem of degrading the convenience of use.

One method of overcoming this problem is a method of making common all authentication functions in a device embedded with a microprocessor unit to allow a user to perform only one authentication operation (e.g., refer to JP-A-2002-298097 (hereinafter called Document 2)).

SUMMARY OF THE INVENTION

With the method described in Document 2, however, although an authentication operation is performed once for a device embedded with a microprocessor unit which has a plurality of application programs each having individually an authentication function, already existing application programs are required to be modified in order to use a common user authentication module. Therefore, in the circumstance where design documents and source code of an already used application program in the IC card are not available, it is difficult to adopt the techniques of Document 2.

The present invention provides techniques capable of using data and functions possessed by a plurality of application programs in a device embedded with a microprocessor unit, by one authentication operation without modifying the already existing application programs.

Specifically, according to the present invention, the device embedded with the microprocessor unit is equipped with an authentication information management part for managing authentication information necessary for authentication at each application program. A user device to be connected to the device embedded with the microprocessor unit is equipped with an authentication information management function utilization part which cooperates with the authentication information management part.

As a user inputs authentication information (called authentication information management part authentication information) requested by the authentication information management part of the device embedded with the microprocessor unit via the authentication information management function utilization part of the user device, and if the authentication information is authenticated by the authentication information management part, the authentication information management utilization part of the user device can utilize authentication information (called application's authentication information) on each application managed by the authentication information management part.

When each application program is utilized, the authentication information management function utilization part of the user device detects an authentication request message from the application program in the device embedded with the microprocessor unit, acquires the application's authentication information requested by the application program from the authentication information management part of the device embedded with the microprocessor unit, and transmits the application's authentication information acquired in behalf of the user to the application program.

Therefore, if the authentication information management part (i.e., device embedded with the microprocessor unit) authenticates the user once, a plurality of authentication processes requested by a plurality of application programs fabricated in the device embedded with the microprocessor unit can be executed between the user device and the device embedded with the microprocessor unit without involvement of a further input by the user, thus realizing single login.

As described above, according to the present invention, authentication information on each application program in the device embedded with the microprocessor unit is stored in the device embedded with the microprocessor unit, and if the user device fabricated with the authentication information management function utilization part is used, a plurality of application programs can be utilized by one authentication operation.

Even if the user device is not equipped with the authentication information management utilization part, the device equipped with the microprocessor unit can be used as it is in a manner similar to the conventional manner.

According to the present invention, even if a plurality of application programs each required to be authenticated and already existing in the device embedded with the microprocessor unit are to be utilized, the authentication operation can be performed only once so that convenience of the user is not damaged.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 6 is a diagram illustratively showing a process flow when input authentication information for an application program is registered, according to a third embodiment.

DESCRIPTION OF THE EMBODIMENTS

Figure 1:
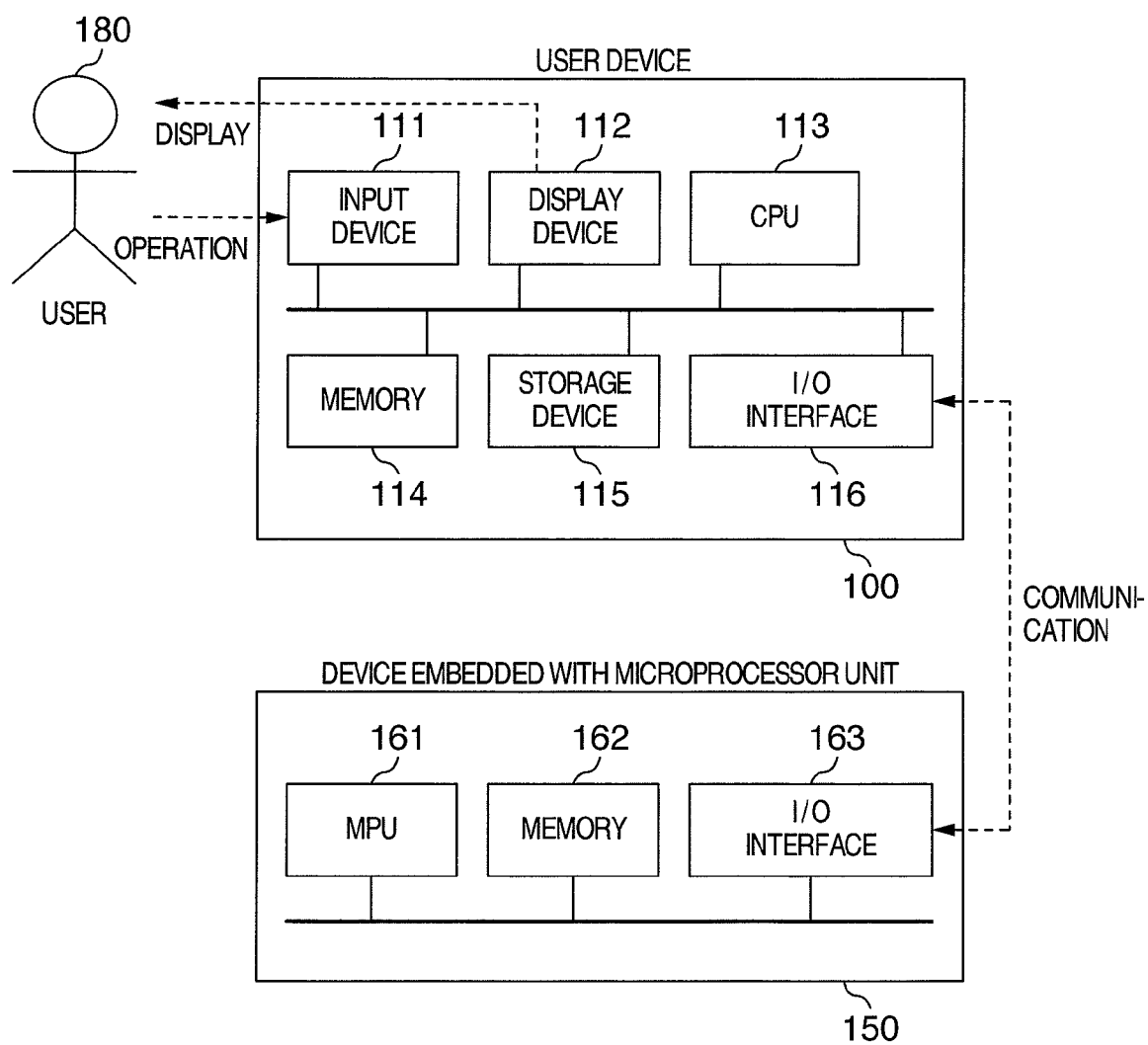
FIG. 1 is a diagram illustratively showing a system configuration.

Preferred embodiments of the present invention will now be described with reference to the accompanying drawings. In the drawings to be described hereunder, identical reference numerals denote similar components and elements. The invention is not limited by these components and elements.

First Embodiment

FIG. 1 is a diagram showing a system configuration to be applied to the embodiment.

This system involves a user device 100 which is a computer to be operated by a user for various transactions, a device 150 embedded with a microprocessor unit, and a user 180 owing the device 150 embedded with a microprocessor unit and uses it via the user device 100. As described earlier, the device 150 embedded with a microprocessor unit includes an IC card, a card called a smart card and the like, although not limiting only to these cards.

The user device 100 is constituted of mainly an input device 111, a display device 112, a CPU 113, a memory 114, a storage device 115 and an input/output interface 116.

The input device 111 is operated by a user using the user device 100 to enter data, commands and the like, and is constituted of a keyboard, a mouse, a biometrics input device, and other devices necessary for authentication.

The display device 112 is used for displaying a message and the like to the user 180 using the user device 100, and is constituted of a CRT, a liquid crystal display device or the like. CPU 113 executes programs stored in the memory 114 and storage device 115 to control constituent elements of the user device and perform various arithmetic operations to thereby realize various processes to be described hereunder.

Figure 2:
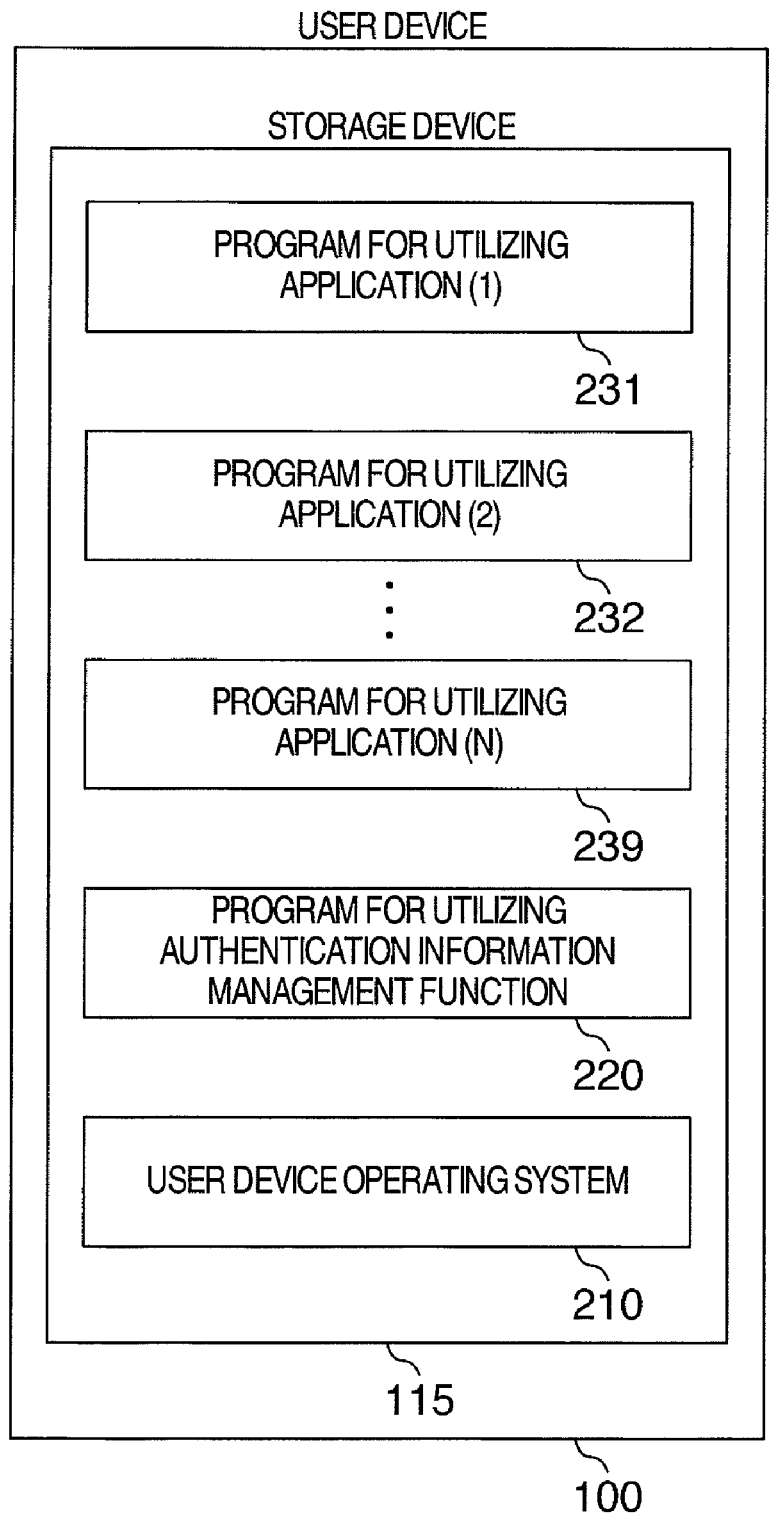
FIG. 2 is a diagram illustratively showing a software configuration of a user device.

The memory 114 temporarily stores programs such as shown in FIG. 2 and data necessary for processes, and is often constituted of a volatile storage medium. The storage device 115 is used for permanently storing programs and data to be used by the user device 100, and is constituted of a nonvolatile storage medium such as a hard disk.

The input/output interface 116 is a physical interface for communicating with the device 150 embedded with a microprocessor unit. For example, the input/output interface 116 corresponds to an IC card reader/writer if the device 150 embedded with a microprocessor unit is an IC card.

The device 150 embedded with a microprocessor unit is constituted of mainly an MPU (microprocessor unit) 161, a memory 162 and an input/output interface 163.

MPU 161 executes programs stored in the memory 162 to control constituent elements of the device 150 embedded with a microprocessor unit and perform various arithmetic operations to thereby realize various processes to be described hereunder.

Figure 3:
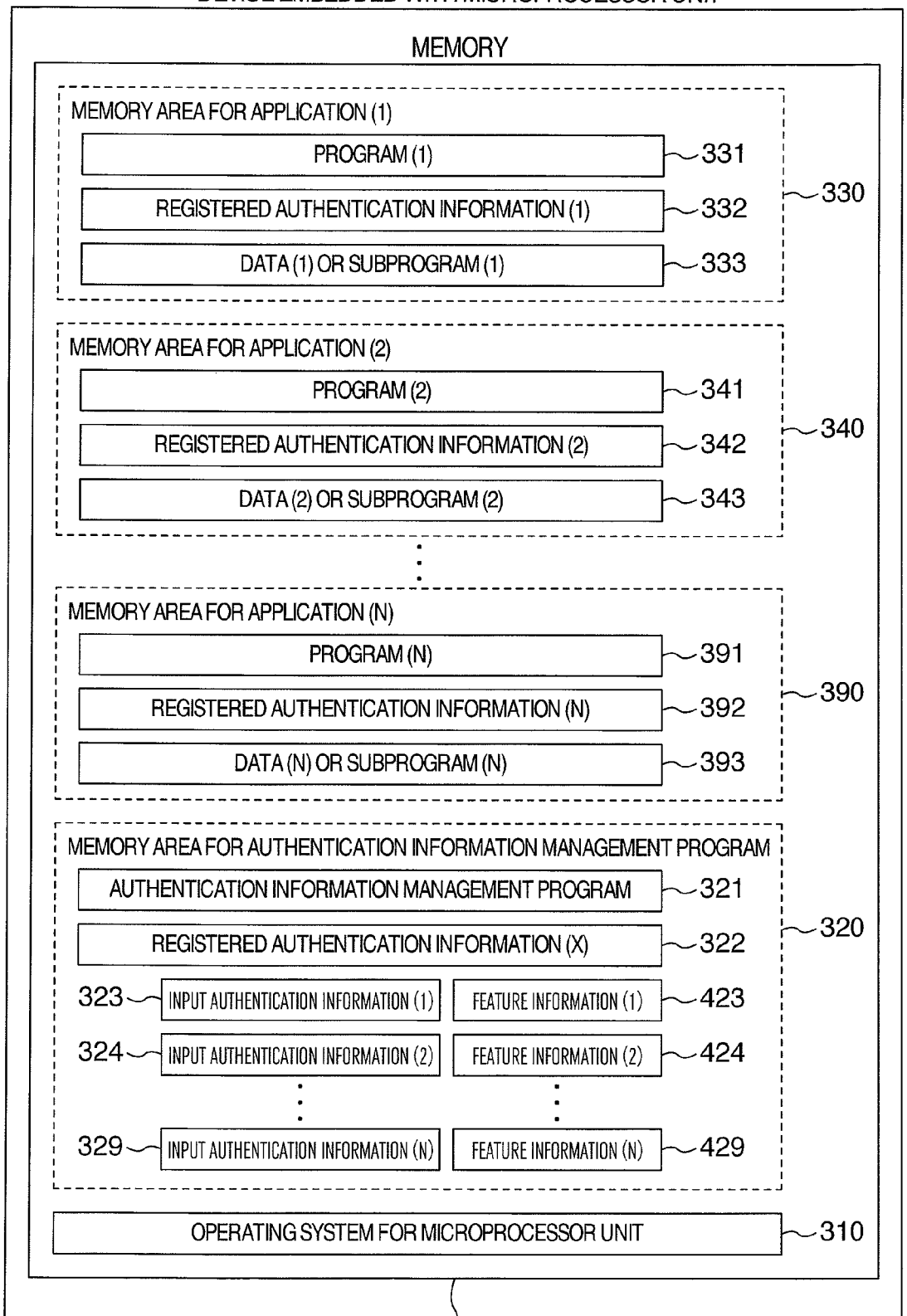
FIG. 3 is a diagram illustratively showing a software configuration of a device embedded with a microprocessor unit.

The memory 162 is constituted of a volatile or nonvolatile storage medium such as a ROM, a RAM and an EEPROM, and stores programs such as shown in FIG. 3 and data necessary for processes. The input/output interface 163 is a physical interface for communicating with the user device 100.

The input/output interface 163 of the device 150 embedded with a microprocessor unit is connectable to the input/output interface 116 of the user device 100 via a network (irrespective of wired or wireless).

FIG. 2 is a diagram showing the software structure of the user device 100.

The storage device 115 of the user device 100 stores an operating system 210 for the user device, a program 220 for utilizing an authentication information management function, a plurality of programs 231, 232, . . . , 239. These programs are read into the memory 114 when necessary and executed by CPU 113 to realize functions to be described later.

FIG. 3 is a diagram showing the software structure of the device 150 embedded with a microprocessor unit.

The memory 162 of the device 150 embedded with a microprocessor unit is allocated with an operating system 310 for the device embedded with a microprocessor unit, and memory areas for applications 320, 330, 340, . . . , 390.

The memory area 320 for an authentication information management program stores an authentication information management program 321, registered authentication information (X) 322 representative of data necessary for authentication of the program, input authentication information 323, 324, . . . , 329 on applications, and feature information 423, 424, . . . , 429.

The memory area 330 for an application (1) stores a program (1) 331 for realizing the application (1), registered authentication information (1) 332, data (1) or subprogram (1) 333 and the like. Similarly, the memory area 390 for an application (N) stores a program (N) 391 for realizing the application (N), registered authentication information (N) 392, data (N) or subprogram (N) 393 and the like. These programs are executed by MPU 161 when necessary to realize functions to be described later.

Next, the function of each program will be described. Although each program is read in the device storing the program and executed by CPU 113 or MPU 161 to realize the corresponding function, for the convenience of description, each program will be described assuming that it is an execution subject.

In FIG. 2, the operating system 210 for the user device is a program for realizing functions such as file management, process management and device management in order to control the entirety of the user device 100.

The programs 231, 232, . . . , 239 for utilizing the applications are user device programs for communicating with corresponding application programs 331, 341, . . . , 391 in the device 150 embedded with a microprocessor unit to use the functions.

The program 220 for utilizing an authentication management function is a program which is activated in the user device 100 to communicate with the authentication information management program 321 in the device 150 embedded with a microprocessor unit to use the function.

The program 220 for utilizing the authentication information management function has the following functions: (a) a function of monitoring transfer of communications or messages between the program 231 for utilizing the application (1), the program 232 for utilizing the application (2), . . . , the program 239 for utilizing the application (N) and the application programs (1) 331, (2) 341, . . . , (N) 391 in the device 150 embedded with a microprocessor unit, and detecting an authentication request from the application programs 331, 341, . . . , 391; (b) a function of requesting the authentication information management program 321 for authentication information corresponding to the application program requested the authentication; (c) a function of displaying a screen urging an input of authentication information and transmission of the authentication information input by the user 180, when authentication by the authentication information management program 321 is requested when the authentication information for the application program is requested to the authentication information management program 321; and (d) a function of registering input authentication information 323, 324, . . . , 329 processed by each application and feature information 423, 424, . . . , 429 on the application in the device 150 embedded with a microprocessor unit.

In FIG. 3, the operating system 310 for the device embedded with a microprocessor unit is a program for realizing functions such as file management, process management and device management in order to control the entirety of the device 150 embedded with a microprocessor unit.

The authentication information management program 321 has a function of returning input authentication information on each application program requested from the program 220 for utilizing the authentication management function and a function of performing authentication for permitting acquisition of input authentication information if authentication was not made after the device 150 embedded with a microprocessor unit is connected to the user device 100.

Authentication by the authentication information management program 321 is performed by using authentication information input by the user 180 via the user device 100 and the registered authentication information (X) 322 to be used for judging whether the input authentication information is really correct. If authentication of the user fails, the authentication information management program 321 does not permit acquisition of the input authentication information on the application program. Authentication herein described is realized by an authentication method using a password or biometrics information.

The registered authentication information (X) 322 is used for acquiring the input authentication information 323, 324, . . . , 329 via the authentication information management program 321, and its storage form may be a value same as that in the input authentication information, a hashed form, or an encrypted form.

The input authentication information (1) 323 is authentication information necessary for accessing the data (1) or subprogram (1) having access limitation, by using the program (1) 331. According to conventional techniques, the user 180 inputs the input authentication information via the user device 100. However, in this embodiment, the input authentication information is stored under management of the authentication information management program 321. Similarly, the input authentication information (2) 324, . . . , input authentication information (N) 329 is stored under management of the authentication information management program 321.

The feature information 423, 424, . . . , 429 for each application is information necessary for distinguishing among respective applications. The feature information is a combination of one or more data including: data representative of the feature of a window (a combination of one or more of: a window size; a window generating process name; a string displayed on a window title bar; a layout of window text input fields, buttons and the like; a window bit map; and the like); data such as input authentication information input from the input device 111 such as a mouse, a keyboard and a biometrics authentication device; data of each message transferred between the user device operating system 210, and an application program in the user device 100 or the device 150 embedded with a microprocessor unit; data acquired by hooking each parameter used when each API is called; data of an order represented by a number indicating at what timing (at which order) each data described above is processed; and other data.

The feature information 423, 424, . . . , 429 is recorded in the memory area 320 for the authentication information management program, in correspondence with the input authentication information 323, 324, . . . , 329 corresponding to the application programs having the feature information.

The memory area 330 for the application (1) stores the program (1) 331 for realizing the application (1), registered authentication information (1) 332 representative of data required by the program, and the data (1) or subprogram (1) 333 to be used by the program (1).

The program (1) 331 is a program for executing a process in response to a request from the program 231 for utilizing the application (1) and realizing a function of returning the process result. The program (1) 331 also realizes a function of performing authentication for permitting acquisition of the input authentication information (1), if the program (1) 331 does not perform authentication at all after the device 150 embedded with a microprocessor unit is physically connected to the user device 100 or if the authentication state is not released after authentication even if the device embedded with a microprocessor unit is being physically connected. If authentication by the program (1) 331 fails, the program 231 for utilizing the application (1) cannot access the data (1) or subprogram (1) 333.

As above, under the condition of authentication success, it becomes possible to use the data (1) to be kept in secret and the subprogram (1) 333 having a specific function such as a sign process with a private key. In order to perform authentication, the program (1) 331 requests the program 231 for utilizing the application (1) for authentication information, and performs authentication by using the input authentication information transmitted from the program 231 for utilizing the application (1) and the registered authentication information (1) 332 corresponding to the input authentication information.

Authentication herein described is realized by an authentication method using a password or biometrics information. If authentication succeeds once, the program (1) 331 stores therein a flag indicating that authentication has already been performed, and operates in a way that further authentication is not necessary as long as the device 150 is connected to the user device 100, which is detected by a method capable of judging a connection state or other methods.

The registered authentication information (1) 332 is used when accessing the data (1) or subprogram (1) 333 via the program (11) 331, and its storage form may be the value same as in the input authentication information, a hashed form, or an encrypted form.

The data (1) or subprogram (1) 333 is data necessary for realizing the application (1) or a program for realizing the function, and is controlled by the program (1) 331. Although the subprogram (1) is defined separately from the program (1) 331 in order to clarify functional separation, the subprogram may be the same module as that of the program (1) 331.

The constituent elements 341 to 343 in the memory area 340 for the application (2) and the constituent elements 391 to 393 in the memory area 330 for the application (N) have the same relation as that of the constituent elements 331 to 333 in the memory area 330 for the application (1).

In the example shown in FIGS. 2 and 3, N application programs in the device 150 embedded with a microprocessor unit exist in one-to-one correspondence with N programs using applications in the user device 100. For example, the program 231 for utilizing the application (1) communicates with the program (1) 331 in the memory area 330 for the application (1) shown in FIG. 3, and the program 239 for utilizing the application (N) communicates with the program (N) 391 in the memory area 390 for the application (N).

It is assumed that the programs 231, 232, . . . , 239 for utilizing the applications have a function of receiving data and functions from the corresponding programs (1) 331, (2) 341, . . . , (N) 391 in the device 150 embedded with a microprocessor unit, and a function of displaying a screen urging an input of authentication information input and transmission of the authentication information input by the user 180 to the program requested the authentication, when authentication request is issued from the programs (1) 331, (2) 341, . . . , (N) 391.

Each program in the device 150 embedded with a microprocessor unit and user device 100 may be stored in advance in the memory 162 or storage device 115, or may be supplied from another device via the input/output interfaces 116 and 163 and media usable by each device. For example, the medium may be a storage medium or a communication medium (i.e., a network or carrier waves and digital signals propagating on the network) which can be mounted on or dismounted from the input/output interfaces 116 and 163.

Figure 4:
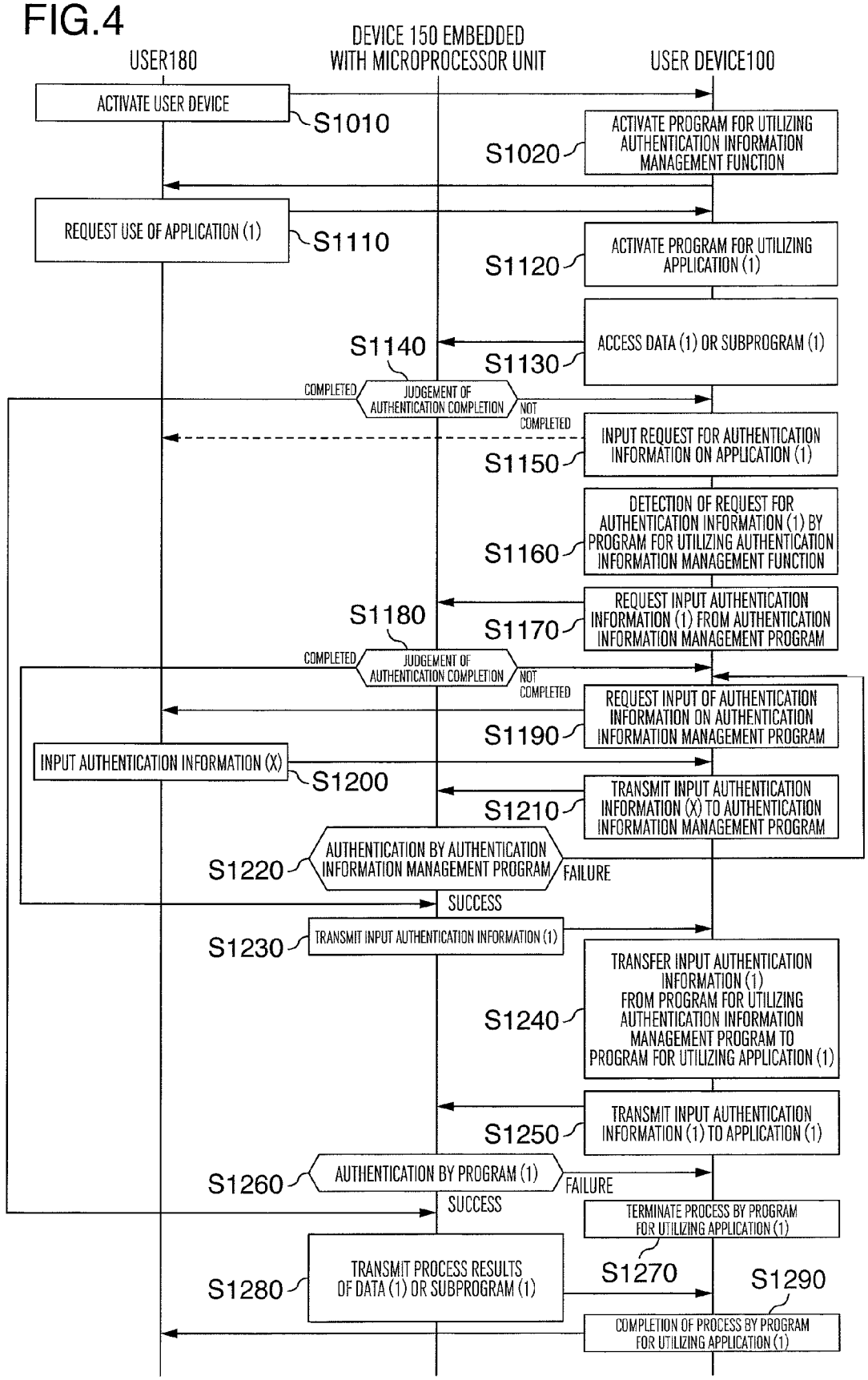
FIG. 4 is a diagram illustratively showing a process flow during an initial process while an application program is used, according to a first embodiment.
Figure 5:
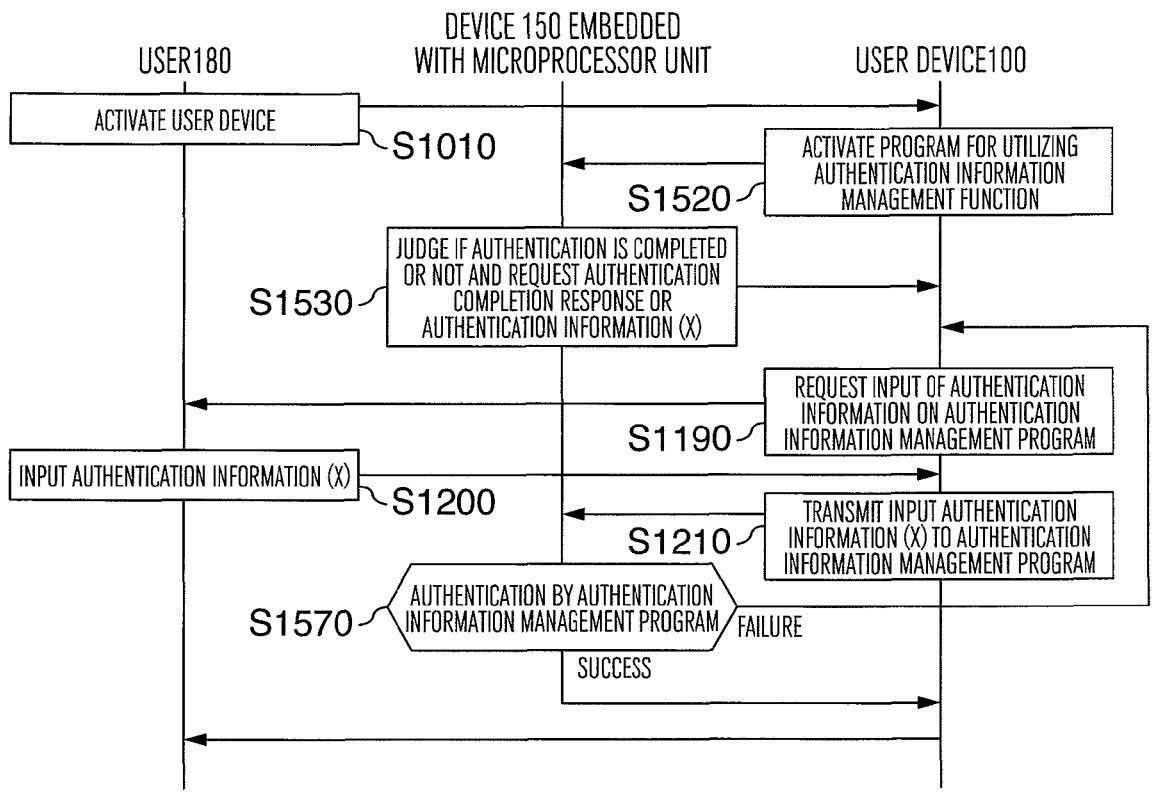
FIG. 5 is a diagram illustratively showing an authentication process flow for single login, according to a second embodiment.

FIGS. 4 and 5 show process flows illustrating the operation of the embodiment in which the user 180 uses each application in the device 150 embedded with a microprocessor unit via the user device 100.

FIG. 4 shows an initial process and a process flow when an application program is used at the first time.

First, the initial process will be described.

The user 180 activates the user device 100 (Step 1010, hereunder Step is abbreviated to S).

In response to activation by the user 180, the user device 100 activates the user device operating system 210 and thereafter activates also the program 220 for utilizing the authentication information management function.

In this case, the program 220 for utilizing the authentication information management function reads the feature information 423, 424, . . . , 429 on respective applications stored in the authentication information management program memory area 320 in the device 150 embedded with a microprocessor unit by using the authentication information management program 321 in the device 150 embedded with a microprocessor unit (S1020).

The initial process is completed in this manner, and the user device 100 displays a screen waiting for an operation by the user 180 so that it enters the state that the user 180 can execute various programs in the user device 100.

Next, description will be made on the case in which an application program in the device 150 embedded with a microprocessor unit is used for the first time after the user device 100 is activated. Although the application (1) is used by way of example, the use order of the application is not limited because similar processes are executed even if which application is first used.

First, the user 180 operates the user device 100 to activate the program 231 for utilizing the application (1) in order to use the application (1) (S1110).

In response to this operation, the user device 100 activates the program 231 for utilizing the application (1) (S1120).

As the program 231 for utilizing the application (1) is executed and when it becomes necessary to access the data (1) or subprogram (1) 333 to be used by the application (1) in the device 150 embedded with a microprocessor unit, the program 231 for utilizing the application (1) in the user device 100 tries to access the program (1) in the device 150 embedded with a microprocessor (S1130).

In response to this access, the program (1) 331 in the device 150 embedded with a microprocessor unit judges whether the user 180 requested the access has already been authenticated, by confirming the above-described authenticated flag or the like, prior to accessing the requested data (1) or subprogram (1) 333 (S1140).

If the program (1) 331 does not authenticate as yet ("not completed" at S1140), access to the requested data (1) or subprogram (1) 333 is not permitted, so that authentication information is requested from the program 231 for utilizing the application (1) in the user device 100. If authentication is completed ("completed" at S1140), the process advances to S1280.

In this example, authentication is still not completed, and the process advances to S1150.

In response to the request, the program 231 for utilizing the application (1) in the user device 100 displays an authentication information input screen or the like to urge the user 180 to input authentication information on the application (1) (S1150).

The program 220 for utilizing the authentication information management function detects the request for authentication information on the application (1), by comparing feature information such as the contents of commands and messages transmitted from and received at the operating system at S1140 and the feature of the authentication screen displayed at S1150, with the feature information 423, 424, . . . , 429 on respective applications read beforehand at S1020 (S1160).

After the request is detected, the program 220 for utilizing the authentication information management function requests the input information authentication information (1) 323 on the application (1) from the authentication information management program 321 in the device 150 embedded with a microprocessor unit (S1170).

The authentication information management program 321 in the device 150 embedded with a microprocessor unit judges whether the user 180 requested the access is authenticated, by confirming the above-described authenticated flag or the like, prior to accessing the input authentication information (1) 323 for the requested application.

If the authentication information management program 321 does not still authenticate, access to the requested input authentication information (1) 323 is not permitted so that the user is requested to input authentication information. If the authentication information management program 321 has already authenticated, the process advances to S1230.

In this example, authentication is still not performed. Authentication information on the authentication information management program is requested from the program 220 for utilizing the authentication information management function in the user device 100 (S1180).

In response to this request, the program 220 for utilizing the authentication information management function in the user device 100 displays an authentication information input screen or the like to urge the user 180 to input authentication information on the authentication information management program.

In this case, the program 220 for utilizing the authentication information management function executes an input suppression process to allow authentication information to be input to the screen displayed by the program 220 for utilizing the authentication information management function, by making the authentication information screen displayed at S1150 and compared with the feature information at S1160, in an inactive state or non-display state (the state that although the screen cannot be viewed, it exists still as a process) (S1190).

The user 180 inputs the authentication information (X) on the authentication information management program in accordance with the authentication information input screen (S1200).

The program 220 for utilizing the authentication information management function transmits the authentication information (X) input from the user 180 to the authentication information management program 321 in the device 150 embedded with a microprocessor unit (S1210).

The authentication information management program 321 in the device 150 authenticates for single login by using the transmitted authentication information (X) and the registered authentication information (X) 322 managed by the authentication information management program 321.

If authentication succeeds, a flag is set indicating authentication completion by the authentication information management program 321, and the process advances to S1230.

If authentication fails, an error message is transmitted to the program 220 for utilizing the authentication information management function. The program 220 terminates the process by displaying an error screen or the like to the user 180 in accordance with the received error message. Alternatively, in accordance with an authentication policy such as the number of consecutive authentication failure times until the process is terminated, and an effective term of authentication information, a request for the authentication information (X) is transmitted again to the program 220 for utilizing the authentication information management function to return to S1190 (S1220).

If it is judged at S1180 that authentication is completed or if authentication succeeds at S1220, then the authentication information management program 321 in the device 150 embedded with a microprocessor unit reads the input authentication information (1) 323 requested at S1170 and transmits it to the program 220 for utilizing the authentication information management function in the user device 100 (S1230).

The program 220 for utilizing the authentication information management function in the user device 100 receives the transmitted input authentication information (1) 323, and transmits the input authentication information 323 as a message on the operating system corresponding to the key input, to the authentication information input screen for the program 231 for utilizing the application (1) whose input was suppressed at S1190, and for the program 231 for utilizing the application (1) which waits for authentication request for the application (1) (S1240).

The program 231 for utilizing the application (1) in the user device 100 transmits the received input authentication information (1) 323 to the program (1) 331 in the device 150 embedded with a microprocessor unit (S1250).

The program (1) 331 in the device 150 embedded with a microprocessor unit authenticates by using the input authentication information (1) transmitted from the user device 100 and the registered authentication information (1) 332 managed by the program (1) in the application (1) (S1260).

If authentication succeeds, a flag is set indicating that the program (1) 331 has already authenticated, and the process advances to S1280. If authentication fails, the program (1) 331 transmits an error message to the program 231 for utilizing the application (1) to advance to S1270 (S1260).

At Step 1270 the program 231 for utilizing the application (1) displays an error screen to the user 180 in accordance with the received error message, and performs termination or the like of the process by the program 231 for utilizing the application (1) (S1270).

If authentication succeeds at S1260, the program (1) 331 in the device 150 embedded with a microprocessor unit accesses the data (1) or subprogram (1) 333 requested at S1130, and transmits the process results of the data (1) or subprogram (1) to the program 231 for utilizing the application (1) in the user device 100 (S1280).

By using the transmitted process results of the data (1) or subprogram (1), the program 231 for utilizing the application (1) in the user device 100 executes a process specific to the application associated with the program 231 for utilizing the application (1) (S1290).

The process to be executed when an application program is used for the first time is completed in the manner described above.

If an application program different from that activated for the first time is to be used thereafter, the processes at S1110 and following Steps in FIG. 4 are executed in the manner similar to that described above. However, in using a different application program, it is judged that authentication has completed at S1180 and the process advances to S1230, because authentication has completed at S1220 during the first use of the application program. In this manner, it is possible to omit the additional input of authentication information by the user 180, realizing a single login.

If an application program used previously once or more is to be used again, the processes at S1110 and following Steps in FIG. 4 are executed in the manner similar to that described above. However, in this case, it is judged at S1140 that authentication has completed because authentication has completed at S1260 during the previous use of the application program, and the process advances to S1280. Also in this case, it is possible to omit the additional input of authentication information by the user 180, realizing a single login.

Further, the processes at S1110 and following Steps in FIG. 4 are executed in the manner similar to that described above, also in the case wherein an application program previously used once or more is to be used after an authentication state of the application program is released by a logoff function or the like of the application program.

Also in this case, however, since authentication has completed at S1230 when the application program was used previously, it is judged at S1180 that authentication has completed, and the process advances to S1230. Also in this case, it is possible to omit the additional input of authentication information by the user 180, realizing a single login.

As described above, even if a plurality of application programs in the device embedded with a microprocessor unit are used, data and functions of the applications can be used only by one authentication operation.

The embodiment can be realized by implementing an additional program 220 for utilizing the authentication information management function and an additional set of authentication information management programs 321 to 329, without amending already existing application programs in both the device 150 embedded with a microprocessor unit and user device 100.

Further, data and functions of a plurality of application programs can be used by one authentication operation even at another user device equipped with the program 220 for utilizing the authentication information management function, if the device 150 embedded with a microprocessor unit is portable such as an IC card, because the device 150 has authentication information of each application program.

Even if another user device is not equipped with the program 200 for utilizing the authentication information management function, the device 150 embedded with a microprocessor unit can be used by a conventional method. It is therefore possible to use both conventional systems and embodiment systems.

Second Embodiment

In the first embodiment, an authentication process for single login is executed when authentication becomes necessary when an application program is to be used for the first time. In the second embodiment, authentication by the authentication information management program 321 is completed when the user device 100 connected to the device 150 embedded with a microprocessor unit is activated.

FIGS. 1 to 3 of the first embodiment are also used in the second embodiment.

FIG. 5 is a flow chart illustrating an authentication process for single login according to the second embodiment. This flow chart illustrates a procedure to be executed among the user 180, user device 100 and device 150 embedded with a microprocessor unit, before the user 180 uses each application in the device 150 embedded with a microprocessor unit. The same process as that shown in FIG. 4 is represented by identical Step numbers.

First, the user 180 activates the user device 100 (S1010).

In response to the activation operation by the user 180, the user device 100 activates the user device operating system 210 and thereafter activates the program 220 for utilizing the authentication information management function.

The program 220 for utilizing the authentication information management function transmits a login request to the authentication information management program 321 in the device 150 embedded with a microprocessor unit in order to obtain access permission at succeeding Steps. In this case, the program 220 for utilizing the authentication information management function reads the feature information 423, 424, . . . , 429 on respective applications stored in the authentication information management program memory area 320 in the device 150 embedded with a microprocessor unit by using the authentication information management program 321 in the device 150 embedded with a microprocessor unit (S1520).

In response to the login request, the authentication information management program 321 in the device 150 embedded with a microprocessor unit judges whether authentication of the user 180 performed the activation operation has been completed, by confirming the authentication flag or the like.

If authentication has been completed by the authentication information management program 321, a response indicating the completion of authentication is transmitted to the program 220 for utilizing the authentication information management function to complete the authentication process for single login. If authentication is still not completed, authentication information on the authentication information management program is requested from the program 220 for utilizing the authentication information management function in the user device 100 (S1530).

When the authentication information is requested, the program 220 for utilizing the authentication information management function in the user device 100 displays an authentication information input screen or the like to urge the user 180 to input the authentication information on the authentication information management program (S1190).

The user 180 inputs the authentication information (X) on the authentication information management program in accordance with the authentication information input screen or the like (S1200).

The program 220 for utilizing the authentication information management function in the user device 100 transmits the authentication information (X) input by the user 180 to the authentication information management program 321 in the device 150 embedded with a microprocessor unit (S1210).

The authentication information management program 321 in the device 150 embedded with a microprocessor unit authenticates by using the transmitted authentication information (X) and the registered authentication information (X) 322 managed by the authentication information management program.

If authentication succeeds, a flag is set indicating authentication completion by the authentication information management program 321, and a response indicating authentication success is transmitted to the program 220 for utilizing the authentication information management function to complete the authentication process for single login.

If authentication fails, an error message is transmitted to the program 220 for utilizing the authentication information management function. The program 220 terminates the process by displaying an error screen or the like to the user 180 in accordance with the received error message. Alternatively, in accordance with an authentication policy such as the number of consecutive authentication failure times until the process is terminated, and an effective term of authentication information, a request for the authentication information (X) is transmitted again to the program 220 for utilizing the authentication information management function to return to S1190 (S1570).

The authentication process for single login is completed in this manner. The system enters the state that the user 180 can execute each program on the user device 100 without further entering authentication information.

When an application program is to be used thereafter, processes are executed similar to S1110 to S1280 in the first embodiment.

With the procedure described above, even if a plurality of application programs in the device embedded with a microprocessor unit are used, data and functions of the applications can be used only by one authentication operation.

The embodiment can also be realized by implementing an additional program 220 for utilizing the authentication information management function and an additional set of authentication information management programs 321 to 329, without amending already existing application programs.

Further, data and functions of a plurality of application programs can be used by one authentication operation even at another user device equipped with the program 220 for utilizing the authentication information management function, if the device 150 embedded with a microprocessor unit is portable such as an IC card, because the device 150 has authentication information for each application program.

Even if another user device is not equipped with the program 220 for utilizing the authentication information management function, the device 150 embedded with a microprocessor unit can be used by a conventional method. It is therefore possible to use both conventional systems and embodiment systems.

Furthermore, the first embodiment shows in some cases both the authentication information input screen displayed by the program for using an application and the authentication information input screen displayed by the program for utilizing the authentication information management function, in parallel. In contrast, in the second embodiment, since the input of authentication information on the program for utilizing the authentication information management function is performed immediately after the user device is activated, the authentication information input screen by the program for utilizing the authentication information management function will not be displayed when the program for utilizing an application is used. The second embodiment has therefore the advantages that superposition of screens can be avoided.

Third Embodiment

In the third embodiment, description will be made on authentication information registration necessary for performing the first or second embodiment.

FIGS. 1 to 3 of the first and second embodiments are also used in the third embodiment.

FIG. 6 is a flow chart illustrating an authentication information registration process necessary for the user 180 to perform single login, to be executed among the user 180, user device 100 and device 150 embedded with a microprocessor unit.

The processes shown in FIG. 6 are used on the assumption that the initial process, such as activation of the user device 100, activation of the program 220 for utilizing the authentication information management function and authentication by the authentication information management program 321, has already completed, as shown in S1010 to S1570 of the second embodiment.

In the following example, although description will be made on a registration procedure for the input authentication information (1) 323 on the application (1), a similar registration procedure is used for other applications, and the use order of the application is not limited.

The user 180 instructs the program 220 for utilizing the authentication information management function in the user device 100 in order to utilize the function of registering authentication information (S2010).

In response to the instruction by the user 180, the program 220 for utilizing the authentication information management function in the user device 100 activates the authentication information registration function. Specifically, for example, a button or the like for starting authentication information registration is displayed on a screen for the user 180 (S2020).

While the screen displayed at S2020 is maintained as it is, the user 180 activates the program 231 for utilizing the application (1) through double clicking of an icon, selection of a program menu or the like, in order to register authentication information on the application (1) and features of a window of the program 231 for utilizing the application (1) (S2030).

In response to the above-described operation, the user device 100 activates the program 231 for utilizing the application (1) (S2040).

As the program 231 for utilizing the application (1) is executed and when it becomes necessary for accessing the data (1) or subprogram (1) 333 to be used by the application (1) in the device 150 embedded with a microprocessor unit, the program 231 for utilizing the application (1) in the user device 100 tries to access the program (1) in the device 150 embedded with a microprocessor unit (S2050).

The program (1) 331 in the device 150 embedded with a microprocessor unit judges whether the user 180 requested the access is authenticated, prior to accessing the requested data (1) or subprogram (1) 333 (S2060). If the application (1) does not authenticate still, access to the requested data (1) or subprogram (1) 333 is not permitted, so that authentication for the user is requested. If the application (1) has already authenticated, the process advances to S2130.

In this example, since authentication is still not completed, authentication information is requested from the program 231 for utilizing the application (1) in the user device 100. In response to this request, the program 231 for utilizing the application (1) in the user device 100 displays an authentication information input screen or the like to urge the user 180 to input authentication information on the application (1) (S2070).

The user 180 instructs the program 220 for utilizing the authentication information management function to start authentication information registration, for example, by depressing the button for instructing the registration start displayed on the screen at S2020. This Step may be executed after S2020. (S2080)

Upon reception of the registration start instruction from the user 180, the program 220 for utilizing the authentication information management function records feature information in the memory 114 or storage device 115 of the user device 100. The feature information is data including: data representative of the feature of a window operated upon after this Step (a window size; a window generating process name; a string displayed on a window title bar; a layout of window text input fields, buttons and the like; a window bit map; and the like); data such as input authentication information input from the input device 111 such as a mouse, a keyboard and a biometrics authentication device; data of each message transferred between the user device operating system 210, and an application program on the user device 100 or the device 150 embedded with a microprocessor unit, data acquired by hooking each parameter used when each API is called; and other data. Transmission of a message or call of each API is performed a plurality of times in some cases during the period from the feature information record start to end. Therefore, the feature information to be recorded is assumed to include not only the contents of each transferred message or each parameter used when API is called, but also the order of transferred messages and called APIs. (S2090)

Next, the user 180 inputs the input authentication information (1) 323 on the application (1) to the input screen displayed at S2070 (S2100).

The program 231 for utilizing the application (1) in the user device 100 transmits the received input authentication information (1) 323 to the program (1) 331 in the device 150 embedded with a microprocessor unit. In this case, the feature information (1) 423 and input authentication information (1) 323 on the program 231 for using the application (1) is recorded at S2090 by the program 220 for utilizing the authentication information management function. (S2110)

The program (1) 331 in the device 150 embedded with a microprocessor unit authenticates by using the transmitted input authentication information (1) and the registered authentication information (1) 332 managed by the program (1) of the application (1). If authentication succeeds, the process advances to the next S2130. If authentication fails, an error message is transmitted to the program 231 for utilizing the application (1), and the program 231 displays an error screen or the like to the user 180 in accordance with the received error message to terminate the registration process and authentication process. (S2120)

If authentication succeeds, the program (1) 331 in the device 150 embedded with a microprocessor unit executes an access to the data (1) or subprogram (1) requested at S2050, and transmits the process results of the data (1) or subprogram (1) to the program 231 for utilizing the application (1) in the user device 100 (S2130).

By using the transmitted process results of the data (1) or subprogram (1), the program 231 for utilizing the application (1) in the user device 100 executes a process specific to the application associated with the program 231 for utilizing the application (1) (S2140).

After completion of the authentication process of the program 231 for utilizing the application (1) at S2140, the user 180 instructs the program 220 for utilizing the authentication information management function to terminate the registration process started at S2090 (S2150).

Upon reception of the registration termination instruction, the program 220 for utilizing the authentication information management function in the user device 100 terminates recording of the feature information started at S2090.

The program 220 for utilizing the authentication information management function transmits the feature information (1) 423 and input authentication information (1) recorded in the memory 114 or storage device 115 in the user device 100 at S2110 to the authentication information management program 321 in the device 150 embedded with a microprocessor unit (S2160).

It is necessary to perform the above-described registration process for each application if authentication information of a plurality of applications is to be registered.

The authentication information management program 321 in the device 150 embedded with a microprocessor unit receives the transmitted feature information (1) and input authentication information (1) 323 on the application (1) (S2170).

In order to ensure security, an authentication strength may be compared between the received input authentication information (1) 323 and an authentication information management program authentication method or the registered authentication information (X) 322.

Comparison of the authentication strength is performed, for example, by an authentication method, the number of bytes of authentication information, a complexity of a combination of used characters, the number of consecutive authentication failure times until the process is terminated, an authentication policy and the like. If the authentication strength of the received input authentication information (1) 323 is weaker than that of the authentication information management program authentication method or registered authentication information (Z) 322, the process advances to S2210. If the authentication strength of the received input authentication information (1) 323 is stronger than that of the authentication information management program authentication method or registered authentication information (Z) 322, a change in the authentication information (X) is requested to the program 220 for utilizing the authentication information management function in the user device 100 to make the authentication method have an authentication strength stronger than that of the received input authentication information (1) 323.

This process is executed in order to avoid that attack such as estimation of authentication information by an unauthorized person becomes easier than the authentication information management program 321 is introduced. The authentication method and authentication information (X) for the authentication information management program 321 are adopted which are stronger than the authentication methods and authentication information of all applications managed by the authentication information management program 321.

Upon reception of the authentication information (X) change request, the program 220 for utilizing the authentication information management function in the user device 100 generates an authentication information (X) change screen and displays it to the user 180 (S2180).

The user 180 inputs new authentication information (X) to the displayed authentication information (X) change screen to make the authentication method having an authentication strength stronger than that of the input authentication information (1) 323 (S2190).

The program 220 for utilizing the authentication information management function in the user device 100 transmits the received input authentication information (X) to the authentication information management program 321 in the device 150 embedded with a microprocessor unit (S2220).

The authentication information management program 321 in the device 150 embedded with a microprocessor unit receives the new authentication information (X), confirms that the authentication strength of the authentication information management program authentication method or registered authentication information (X) 322 is stronger than that of the input authentication information (1) 323 received at S2170, and registers the new authentication information as the new registered authentication information (X) 322. Next, the feature information (1) 423 and input authentication information (1) on the application (1) received at S2170 is stored in the memory area 320 for the authentication information management program, and the result of success/failure or the like of the storing process is returned to the program 220 for utilizing the authentication information management function in the user device 100. (S2210)

Upon reception of the storing process results, the program 220 for utilizing the authentication information management function in the user device 100 generates a message representative of whether the authentication registration succeeds or not, in accordance with the storing process results, and displays it to the user 180. In this way, the user 180 can know the completion of registration of authentication information. (S2220)

The registration process for input authentication information has been completed in the manner described above. If there are a plurality of applications whose authentication information is to be registered, the procedure from S2010 to S2220 is performed for each application. Even if a plurality of application programs in the device 150 embedded with a microprocessor unit are to be used, data and functions possessed by the application programs can be used by one authentication operation.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. An authentication information management system for managing an application program's authentication information to be used for user authentication as required by the application program, comprising:

a device embedded with a microprocessor unit having a plurality of application programs, with each application program being executable by the device embedded with the microprocessor unit and requiring the user authentication; and a user device equipped with a plurality of application utilization programs for utilizing the application programs, with each application utilization program being executable by the user device, wherein:

the device embedded with the microprocessor unit includes an authentication information management part for managing the application programs' authentication information;

the user device includes an authentication information utilization part for utilizing the authentication information management part;

when an application utilization part embodied through execution of each of the application utilization programs in the user device utilizes an application part embodied through execution of a corresponding one of the application programs in the device embedded with the microprocessor unit, the application part of the device embedded with the microprocessor unit requests the application program's authentication information of a user in the user authentication from the application utilization part of the user device;

the authentication information utilization part of the user device detects a request for the application program's authentication information of the user issued to the application utilization part, and requests the application program's authentication information corresponding to the application part of the device embedded with the microprocessor unit from the authentication information management part of the device embedded with the microprocessor unit;

the authentication information management part of the device embedded with the microprocessor unit acquires the requested application program's authentication information from the device embedded with the microprocessor unit, and responds to the authentication information utilization part of the user device;

the authentication information utilization part of the device embedded with the microprocessor unit transmits the application program's authentication information received from the authentication information management part of the device embedded with the microprocessor unit to an interface of the application utilization part of the user device to make manual input operation of the application program's authentication information by the user unnecessary; and the application utilization part of the user device transmits the received application program's authentication information to the application part of the device embedded with the microprocessor unit.

2. The authentication information management system according to claim 1, wherein:

the authentication information management part of the device embedded with the microprocessor unit is embodied through execution of an authentication information management program, which is separated from the application program; and the authentication information utilization part of the user device is embodied through execution of an authentication information utilization program, which is separated from the application utilization program.

3. The authentication information management system according to claim 1, wherein:

the authentication information management part of the device embedded with the microprocessor unit checks whether the user has already been authenticated, in response to the request for the application program's authentication information by the authentication information utilization part of the user device, and if still not authenticated, requests authentication information management part authentication information from the authentication information utilization part of the user device;

the authentication information utilization part of the user device receives the authentication information management part authentication information from the user and transmits the authentication information management part authentication information to the authentication information management part; and the authentication information management part of the device embedded with the microprocessor unit authenticates the user by using the authentication information management part authentication information received from the authentication information utilization part of the user device, and after authentication of the user, transmits the requested application program's authentication information to the authentication information utilization part of the user device.

4. The authentication information management system according to claim 3, wherein:

the application utilization part of the user device displays a screen for inputting the a application program's authentication information when the application part of the device embedded with the microprocessor unit requests the application program's authentication information; and the authentication information utilization part of the user device makes the displayed screen in an inactive state or in a non-display state not to accept an input from the user to the screen, when the request of the application program's authentication information by the user to the application utilization part is detected.

5. The authentication information management system according to claim 4, wherein the authentication information utilization part of the user device has recorded feature information regarding an authentication process for the user by the application utilization part, compares the recorded feature information with a feature of the screen displayed by the application utilization part for inputting the application program's authentication information and makes the screen in the inactive state or in the non-display state if the feature coincides with the feature information.

6. The authentication information management system according to claim 3, wherein:

the authentication information utilization part of the user device urges the user to input the authentication information management part authentication information, and after the user activates the user device and before any one of the application utilization parts starts utilizing the application part, transmits the authentication information management part authentication information input by the user to the authentication information management part of the device embedded with the microprocessor unit; and the authentication information management part of the user device authenticates the user by using the authentication information management part authentication information received from the authentication information utilization part of the user device, and if authentication succeeds, makes setting representative of that the user has already been authenticated, to prevent plural screens for inputting authentication information from being displayed.

7. An authentication information registration system for registering an application program's authentication information to be used for user authentication required by the application program, comprising:

a device embedded with a microprocessor unit having a plurality of application programs, with each application program being executable by the device embedded with the microprocessor unit and requiring the user authentication; and a user device equipped with an application utilization program for utilizing each of the application programs, with each application utilization program being executable by the user device, wherein:

the device embedded with the microprocessor unit includes an authentication information management part, which is separated from the application program, for managing the application program's authentication information;

the user device includes an authentication information utilization part, which is separated from the application utilization program, for executing a registration process of registering the application program's authentication information by using the authentication information management part;

when an application utilization part embodied through execution of each of the application utilization programs in the user device utilizes an application part embodied through execution of a corresponding one of the application programs in the device embedded with the microprocessor unit;

the authentication information utilization part of the user device:

receives a registration start instruction for the application program's authentication information from a user and starts the registration process;

records feature information and application program's authentication information regarding an authentication process for the user by the application utilization part of the user device; and transmits the record information to the authentication information management part of the device embedded with the microprocessor unit; and the authentication information management part stores the received record information in the device embedded with the microprocessor unit; and wherein the authentication information utilization part makes reference of the feature information available in response to a request from the authentication information management part, such that the authentication information utilization part makes an authentication information input screen in an inactive state or non-display state, when a request of the application program's authentication information by the user to the application utilization part is detected.

8. The authentication information registration system according to claim 7, wherein:

the authentication information utilization part of the user device executes the registration process for feature information and application program's authentication information regarding each of the application programs; and the authentication information management part of the device embedded with the microprocessor unit stores each of a plurality of pieces of the feature information and application program's authentication information recorded by the authentication information utilization part of the user device, in correspondence with each of the application programs.

* * * * *